April 2, 1935.  H. F. SHEPHERD  1,996,555
ENGINE FUEL REGULATOR
Filed May 27, 1931  2 Sheets-Sheet 1

INVENTOR
*Harold F. Shepherd*
BY
*Ward, Crosby & Neal*
ATTORNEYS

April 2, 1935. H. F. SHEPHERD 1,996,555
ENGINE FUEL REGULATOR
Filed May 27, 1931 2 Sheets-Sheet 2
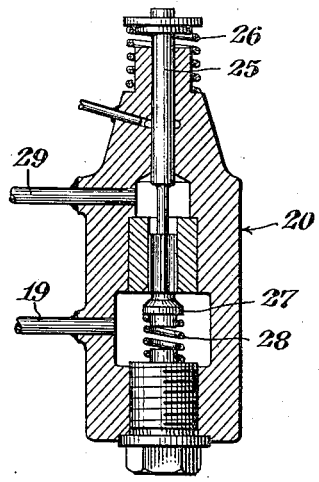
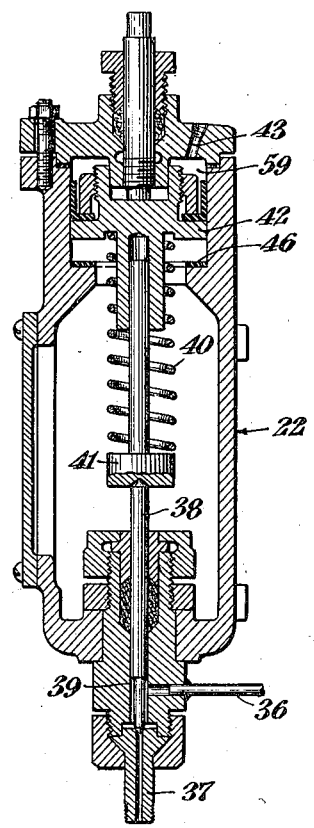
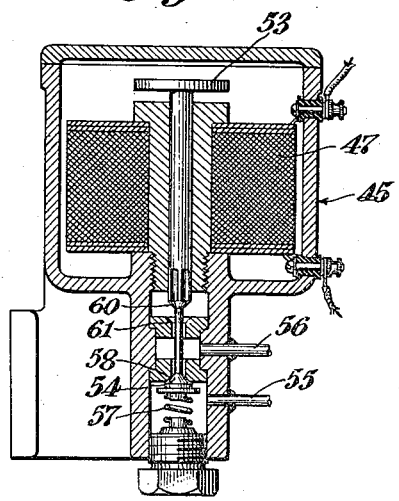
INVENTOR
*Harold F. Shepherd*
BY
*Ward, Crosby & Neal*
ATTORNEYS Patented Apr. 2, 1935

1,996,555

UNITED STATES PATENT OFFICE 1,996,555

ENGINE FUEL REGULATOR

Harold F. Shepherd, Mount Vernon, Ohio, assignor to Cooper-Bessemer Corporation, Mount Vernon, Ohio, a corporation of Ohio Application May 27, 1931, Serial No. 540,350

2 Claims. (Cl. 123—32)

The invention aims primarily to provide a fuel control system which will improve the operation of engines of the Diesel type, particularly when operating at low loads, or when idling. Under the last mentioned conditions of operation it has been found that the operation of the engine is likely to be inefficient and uncertain.

In accordance with the present invention, I provide means for automatically changing the fuel oil pressure with a change in load, the fuel pressure being reduced under low load conditions in such manner that the penetration of the fuel jets is limited to the hotter core of the charge, and the hotter center of the piston head, the mixture being thereby better ignited than if the light load fuel charge were injected by such high pressure as to range the entire volume of air contained within the cylinder.

Furthermore, by reducing the pressure as above described, instead of relying entirely upon reduction in the lift of the spray valve for regulation, the lift may remain comparatively high at low loads and be substantially unaffected by slight variations in cam contour, thereby securing better distribution of the fuel between different cylinders under low load conditions. Where reduction in valve lift is solely relied upon for regulation under light loads, it is sometimes found that inequalities in the rate of wear of the fuel cams will cause decided inequalities in the fuel distribution, or even cause certain cylinders to be entirely cut out, a condition which my invention largely eliminates.

Further objects and advantages of the invention will be in part obvious and in part specifically referred to in the description hereinafter contained which, taken in conjunction with the accompanying drawings, discloses a preferred embodiment of the invention. Such embodiment, however, is to be considered as merely illustrative of its principles. In the drawings:

Fig. 2 is a vertical section of the fuel measuring valve;

Fig. 3 is a vertical section of the servo motor fuel pressure relief mechanism;

Fig. 4 is a vertical section of the magnetic valve;

Figure 1:
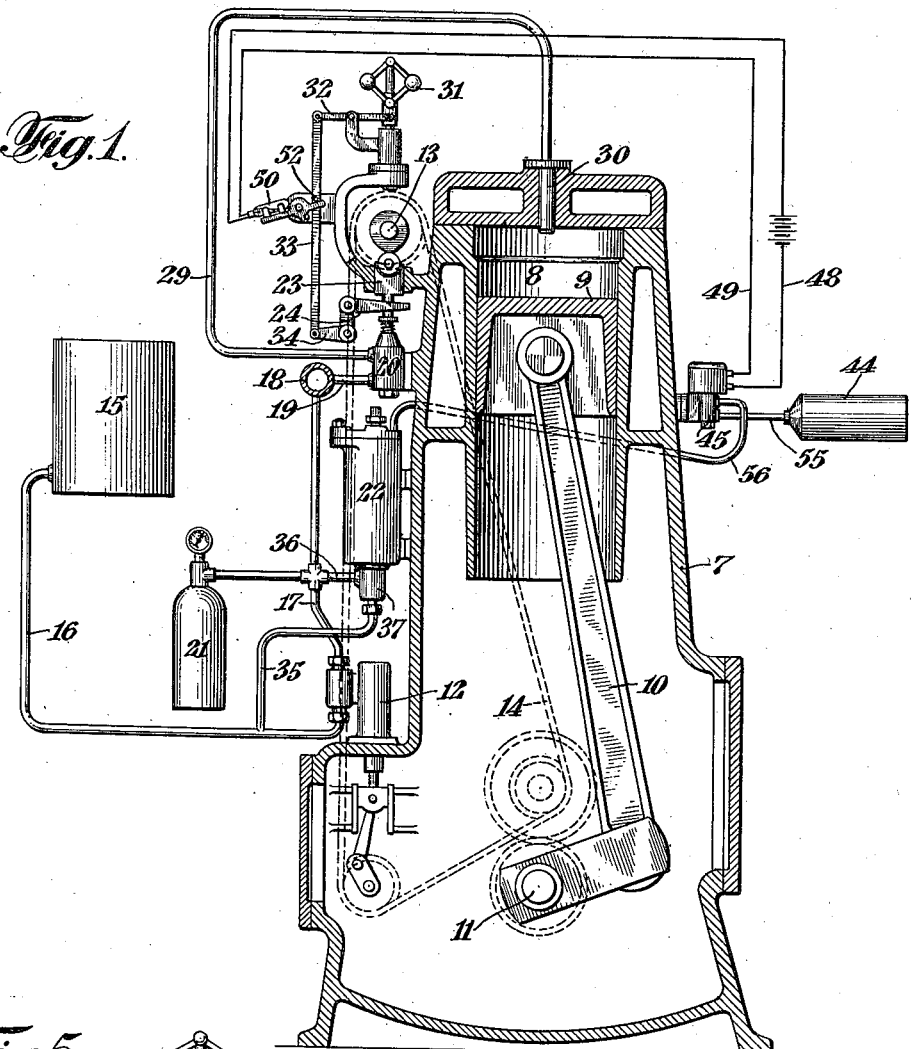
Fig. 1 is a cross section of an engine to which my invention is applied.

For the purpose of disclosure, there is shown in Fig. 1 an engine of the type disclosed in the application of Hewitt A. Gehres and Harold F. Shepherd, Ser. No. 478,322, for a Fuel oil measuring device, filed August 28, 1930, in which is disclosed a fuel oil measuring device which is claimed in said application. It is understood, of course, that the invention herein disclosed is not limited to the type of engine, the fuel oil measuring device, or any of the specific mechanisms disclosed in said application.

Referring to Fig. 1, the engine includes the usual engine block 7 provided with a plurality of cylinders 8 in each of which operates a piston 9 connected to a piston rod 10 mounted on the crank shaft 11. The engine also includes a fuel oil pump 12 and a cam shaft 13, driven by a sprocket chain 14 from the crank shaft 11, as indicated in Fig. 1.

Fuel oil is supplied to the pump 12 from a fuel oil supply tank 15 through a pipe 16. The fuel oil is pumped by the pump 12 through a pipe 17 to a common rail 18 which is connected by pipes 19 to the various measuring devices 20, as is well understood. The pipe 17 also makes connection with a bottle 21 which is made of sufficient size to contain a volume of fuel oil which, in addition to that contained in the common rail, allows one or more discharges of fuel oil to the engine without a serious drop of pressure.

The pipe 17 also makes connection with a servo motor fuel oil pressure relief mechanism 22, which will be described more specifically later.

As the cam shaft 13 rotates its cams depress roller bearing slides 23 which through wedges 24 depress valve stems 25 against compression springs 26 to open the fuel measuring valves 27 normally held seated by springs 28. As the valves 27 are opened fuel oil is admitted from the common rail 18 past the valves and through pipes 29 to nozzles 30 in the cylinders. The amount of fuel oil delivered through the valves is controlled by the wedges 24 whose position is controlled by a governor 31 driven from the cam shaft 13 by any suitable mechanism which, as the speed increases, rocks a lever 32 counterclockwise and through a link 33 and an arm 34 on a shaft withdraws the wedges so that the amount of fuel oil injected is reduced with the speed of the engine.

For the purpose of decreasing the pressure of the fluid oil in the common rail 18, I provide the pressure relief mechanism 22 which upon operation will permit the fuel oil to flow from the bottle 21 and the common rail 18 through a pipe 35 back to the fuel oil supply tank 15 thereby decreasing the pressure of the fuel oil in the common rail 18 and the bottle 21. The fuel oil pressure is preferably the same for all loads except for a fractional part of the loading at which time the pressure relief mechanism functions to reduce the pressure of the fluid oil measured passing through the measuring valves 20.

The pressure relief mechanism is shown in Fig. 3 in which the connections with the pipe 17 and the pipe 35 are indicated respectively at 36 and 37. The relief valve 38 may be tapered as shown to seat on the upper end of the member 37. This tapered end is formed on a reduced portion of the valve and defines a shoulder 39 with the main body of the valve, against which fuel oil pressure admitted through the connection 36 from the pipe 17 from the bottle 21 and common rail 18, operates to lift the valve against the compression of the spring 40, one end of which is seated on a member 41 resting on the relief valve 38, and the other end of which bears against an air piston 42, which is adapted to be moved from the position shown in Fig. 3 by air under pressure admitted through the port 43 from a storage tank 44, Fig. 1, under control of a magnetic valve 45, Figs. 1 and 4, against shoulder 46 thereby increasing the compression of the spring 40 to prevent the relief valve 38 from being opened by fuel oil pressure below the predetermined amount.

Figure 5:
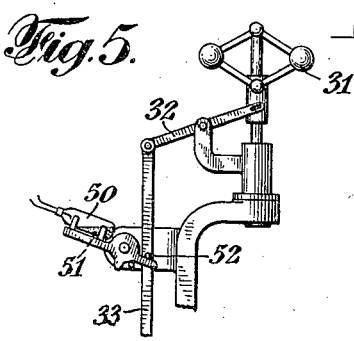
Fig. 5 is a detail of the mercury switch and governor control thereof.
Figure 6:
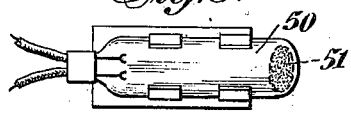
Fig. 6 is a top plan view of the mercury switch.

The magnetic valve 45, Fig. 4, comprises a casing in which is fixed a solenoid 47, the terminals of which are connected by wires 48 and 49 in a circuit adapted to be completed by the mercury switch 50, Figs. 1, 5 and 6.

The mercury switch may be of the usual type comprising a bulb which carries a globule of mercury 51 adapted, when the switch is in the position shown in Fig. 1, to complete the circuit from battery over the wires 48 and 49 and across the solenoid 47. In Fig. 1 the governor is shown in the position it takes when the engine runs at normal load in which the mercury switch operated by a pin 52 on the link 33 is in the position in which it completes the circuit across the solenoid 47. In Fig. 5 the governor is shown in the position it assumes when the engine is running at low load in which position it has moved the mercury switch to open the circuit across the solenoid 47.

When the engine is running at normal loads the circuit through the solenoid 47 is completed and the core 53 thereof is in attracted position, thus holding valve 54 open and admitting air from pipe 55 leading from pressure tank 44 through valve 54 to pipe 56 to the pressure relief valve mechanism 22. Piston 42 is thereby pressed toward shoulder 46 to increase the compression of spring 40 upon the relief valve 38. The latter therefore will relieve the pressure on fuel rail 18 only at a relatively high or normal point.

When the engine is operating at low loads, or idling, the switch 50 is moved to the position shown in Fig. 5, thereby opening circuit to solenoid 47, permitting the spring 57 to move valve 54 on its seat 58 and cut off the air pressure to piston 42 of the relief mechanism 22. Under these conditions a reduced pressure is applied by spring 40 to the relief valve 38, and the latter accordingly will relieve the pressure in the fuel rail 18 at a lower point, resulting in a lower fuel injection pressure.

The core 53 of the magnetic valve preferably is provided with a valve face 60 which seats on a valve seat 61 as connections are made between pipes 55 and 56. As the valve is moved into the position shown in Fig. 4, air under pressure in the space 59 in the relief valve above the air piston 42 may exhaust past the valve 60 and the valve seat 61 and out along the core 53 or through a port in the side of the valve casing.

Thus the fuel will be more confined to the central region of the cylinder space at low loads, and a greater fuel valve lift is afforded to secure the advantages first above mentioned.

While a specific form of the invention has been described, it should be understood that many changes may be made therein without departing from its essential mode of operation and results, as set forth in the appended claims.

What I claim is:

1. The combination with an engine of the class described, means for delivering fuel under pressure to the engine cylinders, a relief valve operated by the fuel under pressure for controlling the pressure on the fuel, a piston, a spring between said piston and valve for closing said valve, a source of fluid under pressure adapted to operate said piston in one direction, and means controlled by said engine for admitting said fluid to said piston to cause the valve to decrease the relief pressure of the fuel under low load conditions.

2. The combination with an engine of the class described, a relief valve for controlling the pressure of the fuel delivered to the engine cylinders to provide for relatively low fuel pressure for idling speed or low loads and relatively higher pressure for full loads, said relief valve including an air pressure operated piston for controlling the same, a source of fluid pressure for operating said piston, a magnetic valve for controlling the admission of fluid pressure from said source against said piston, and a switch controlled by the engine when running at idling speed or at low loads for altering the circuit to said magnetic valve to cause said magnetic valve to admit fluid pressure against said piston to lower the pressure at which said relief valve will operate

HAROLD F. SHEPHERD.